US 6,557,532 B1

(12) United States Patent
Nakayama et al.

(10) Patent No.: US 6,557,532 B1
(45) Date of Patent: May 6, 2003

(54) FUEL INJECTION APPARATUS AND METHOD FOR CYLINDER INJECTION TYPE INTERNAL COMBUSTION ENGINE

(75) Inventors: Yoko Nakayama, Oyamazakicho (JP); Toshiharu Nogi, Hitachinaka (JP); Takuya Shiraishi, Hitachinaka (JP); Yoshihiro Sukegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 09/653,167

(22) Filed: Sep. 1, 2000

(30) Foreign Application Priority Data

Dec. 15, 1999 (JP) .......................................... 11-356034

(51) Int. Cl.⁷ ................................................. F02B 3/10
(52) U.S. Cl. ........................ 123/490; 123/299; 361/154
(58) Field of Search ................................. 123/295, 299, 123/490; 361/154

(56) References Cited

U.S. PATENT DOCUMENTS 5,402,760 A * 4/1995 Takeuchi et al. ............ 123/300
6,005,763 A * 12/1999 North ........................ 123/490
6,209,513 B1 * 4/2001 Sakasai et al. .............. 123/299

FOREIGN PATENT DOCUMENTS

| JP | 7 119507 | 5/1995 |
| JP | 11-159382 | 6/1999 |

* cited by examiner

*Primary Examiner*—Erick Solis
(74) *Attorney, Agent, or Firm*—Crowell & Moring LLP

(57) ABSTRACT

With a cylinder direct injection engine in which fuel is injected directly into combustion chambers and air-fuel mixture is guided by an air flow, it is difficult to secure combustion stability under low engine speed and low load conditions such as during idling. Furthermore, there are needs for improvement of emission characteristics and fuel economy in other operation modes as well. An engine according to the invention injects fuel while dividing the same in plural-parts during a compression stroke. The first injection forms a lean air-fuel mixture around an ignition plug, and the second injection makes a flammable air-fuel mixture reach an area around the ignition plug. This ensures efficient stratified combustion and allows improvement in emission and fuel economy performance.

10 Claims, 19 Drawing Sheets

FIG.3A
SINGLE-SHOT INJECTION
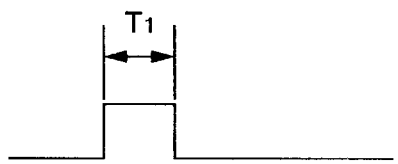
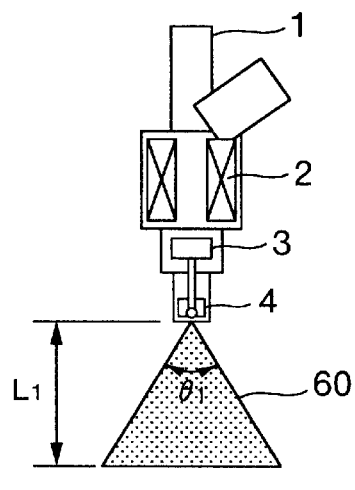
FIG.3B
DOUBLE-SHOT INJECTION
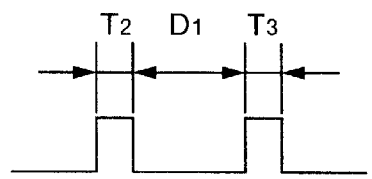
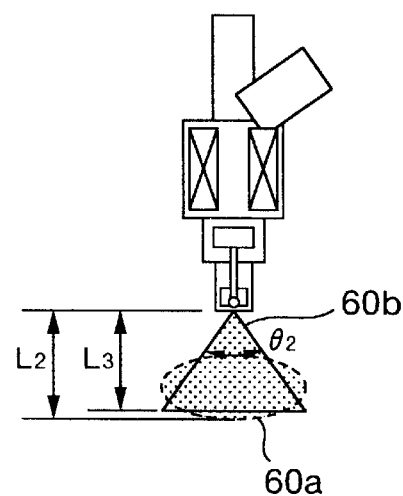
FIG.3C
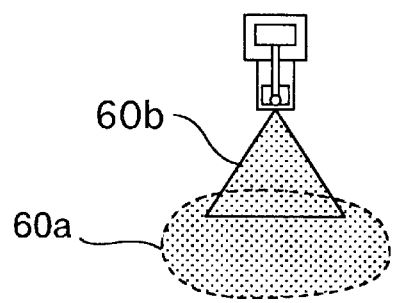

| | INTAKE STROKE | COMPRESSION STROKE | EXPANSION STROKE | EXHAUST STROKE |
|---|---|---|---|---|
| | INJECTION | | | |
| (1) | ▬▬▬ | | | |
| (2) | ▬ ▬ | | | |
| (3) | ▬ | ▬ | | |
| (4) | | ▬▬ | | |
| (5) | | ▬ ▬ | | |
| (6) | | ▬▬ | ▬ | |

FIG.16

STRATIFIED COMBUSTION
AT LOW ENGINE SPEED
+ WIDE-ANGLE SPRAYING

STRATIFIED COMBUSTION
AT LOW ENGINE SPEED
+ NARROW-ANGLE SPRAYING

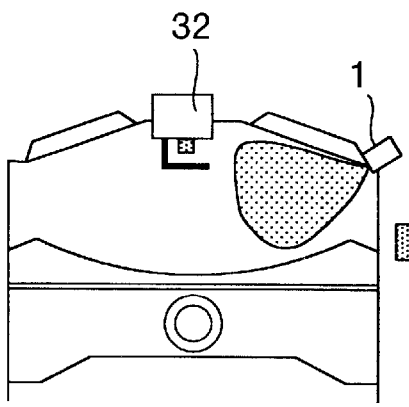

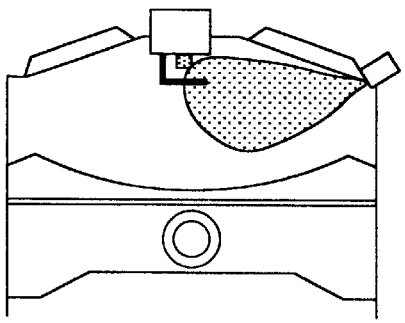

HOMOGENEOUS COMBUSTION
WITH FULLY-OPEN VALUE
AT HIGH ENGINE SPEED
+ NARROW-ANGLE SPRAYING

STRATIFIED COMBUSTION AT
MEDIUM ENGINE SPEED
+ NARROW-ANGLE SPRAYING
+ DOUBLE-SHOT INJECTION

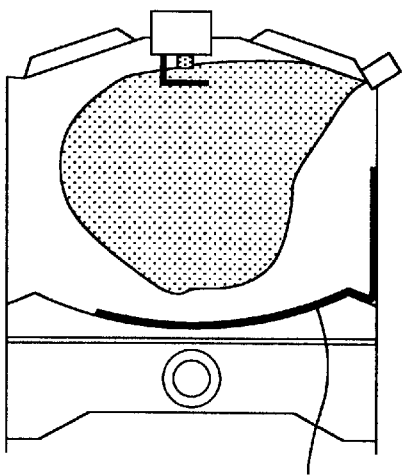

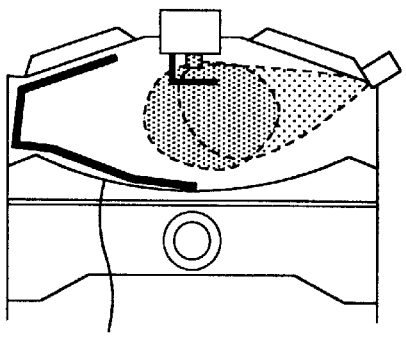

REDUCED DEPOSITS ON WALL SURFACES

REDUCED DEPOSITS ON WALL SURFACES

FIG.17
STRATIFIED
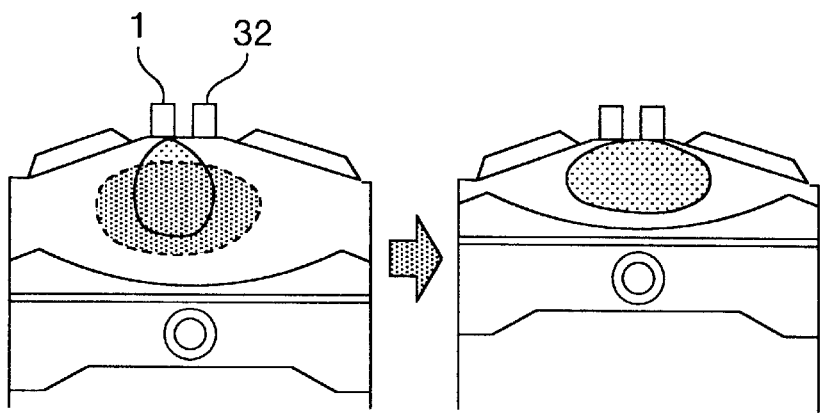
HOMOGENEOUS
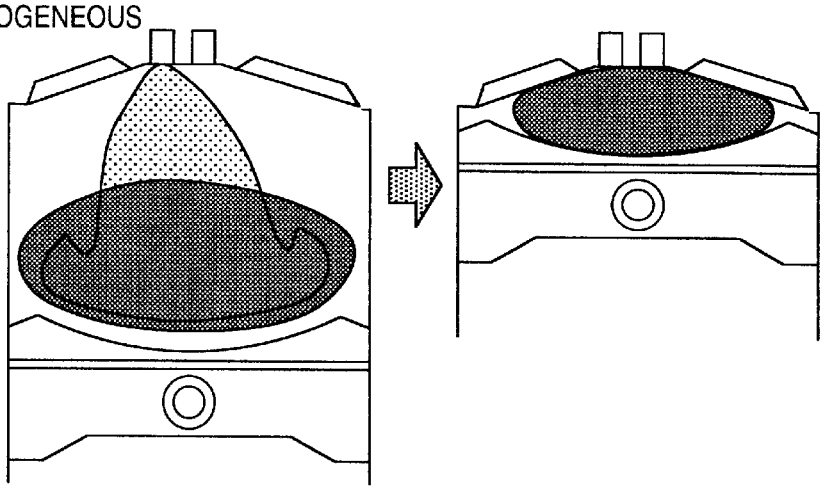

DRAWING OF INJECTOR STRUCTURE

WIRING DIAGRAM

ONE INJECTION TIMING

FUEL INJECTION APPARATUS AND METHOD FOR CYLINDER INJECTION TYPE INTERNAL COMBUSTION ENGINE

BACKGROUND OF THE INVENTION

The present invention relates to a cylinder injection type internal combustion engine that supplies fuel directly into combustion chambers by fuel injection valves.

JP-A-11-159382 describes a technology directed to a cylinder injection engine (hereafter simply referred to as engine), which comprises fuel injection valves (hereafter simply referred to as injector) for supplying fuel directly into combustion chambers and, when the engine is in an operation zone of low engine speed and low load conditions, injects fuel in compression strokes to stratify and burn air-fuel mixture. The technology is for improving fuel consumption by injecting fuel in plural times during a compression stroke, when the engine is in an operation zone wherein at least either the load or engine speed is relatively high within a stratified combustion region, to thereby extend the stratified operation zone.

JP-A-7-119507 describes a technology of injecting fuel while dividing the same in the uniform combustion (synonymous with homogeneous combustion) region under high load and low engine speed conditions and thus reducing the injection quantity at one time to achieve uniform combustion through effective atomization and diffusion of fuel.

Both the conventional technologies described above employ injectors with long-distance spray penetration and use pistons as guides or hit plugs directly with fuel. Accordingly, the injected fuel deposits on the pistons in the stratified combustion region or deposits on combustion chamber walls after passing through the ignition plugs, and they cannot improve fuel economy or reduce emissions as much as theoretically possible. Besides, even if fuel is divided and injected in plural times at one fuel injection timing, much of the fuel contacts the pistons and the combustion chamber walls due to the character of the system, resulting in insufficient improvement in fuel economy and emission reduction.

Injectors conventionally used in cylinder injection type internal combustion engines are driven by high-voltage generators including capacitors. In case of driving the injector for opening and closing plural times during one injection timing, time for charging the capacitor is required while the valve is closed between injections, and the injection interval cannot be shortened. Accordingly, another problem is that fuel cannot be injected multiple times during one injection timing if the duration of the combustion stroke in a high-speed operation zone is short.

Furthermore, the conventional art described above do not discuss any stratified combustion that takes place in such an engine operation zone wherein a starter is operated. This means that an engine is started with a high air-fuel ratio to avoid combustion failure because a failure in stratified combustion under such conditions will result in several times the normal amount of HC emissions to make it impossible to meet severe European emission regulations.

However, the higher the air-fuel ratio used for starting, the more HC is emitted. Besides, the conventional art described above do not give consideration to the fact that operating the injectors multiple times during one fuel injection timing results in heavy power consumption.

BRIEF SUMMARY OF THE INVENTION

It is one of objects of the present invention to enlarge the region of stratified combustion as compared with the conventional art so as to improve fuel economy as well as emission characteristics.

Another object of the invention is to improve fuel economy as well as emission characteristics by extending the operation zones in which fuel is injected multiple times during one injection timing.

Still another object of the invention is to lessen power consumption even when the injector is opened and closed multiple times during one injection timing.

To attain any one of the above objects, according to the first aspect of the invention, a fuel injection valve is so constructed that the state of the current flowing through an electromagnetic coil varies between a Valve Starting To Open state and a subsequent Valve Held Open state, and that the cycle of the Valve Starting To Open state and the Valve Held Open state is repeated at least twice during one fuel injection timing.

According to the second aspect of the invention, a fuel injection valve is so constructed that two electromagnetic coils are provided and the state of the current flowing through them is switched between a Valve Starting To Open state and a subsequent Valve Held Open state, and that the cycle of the Valve Starting To Open state and the Valve Held Open state is repeated at least twice during one fuel injection timing and the state of the current flowing is switched every time the cycle is repeated.

Preferably, in the constructions according to the first and the second aspect, the cycle of the Valve Starting To Open state and the Valve Held Open state is repeated at least twice at a given valve closing interval during one fuel injection timing.

According to the third aspect of the invention, a fuel injection valve is so constructed as to have a valve element and a valve seat for opening and closing a fuel passage, include a radial fuel passage upstream of the valve seat and extending radially from outside to inside for imparting a swirling force to fuel and form a fuel flow in the radial fuel passage at least twice during one fuel injection timing, which flows radially from outside to inside.

According to the fourth aspect of the invention, a fuel injection valve is so constructed as to open and close a fuel passage at least twice during one fuel injection timing during the operation of a starter.

According to the fifth aspect of the invention, a fuel injection valve is so constructed as to switch between a spraying state of long penetration and another spraying state of short penetration, use the short penetration spraying state in a stratified combustion region, use the long penetration spraying state in a homogeneous combustion region, and inject fuel at least twice during one fuel injection timing when the spray penetration is short.

According to the sixth aspect of the invention, a fuel injection valve is so constructed as to include, in its injection hole, a deflection element for deflecting fuel spray in a direction to an ignition plug and inject fuel from the deflection element toward the ignition plug at least twice during one fuel injection timing.

According to the seventh aspect of the invention, a fuel injection valve is constructed so that an air flow generator, provided in an intake port, creates an air flow in a combustion chamber, the valve divides and injects the fuel required for combustion in plural times, and fuel spray in plural times is guided in a direction to a ignition plug by the air flow.

BRIEF DESCRIPTION OF THE SEVERAL VIEWS OF THE DRAWING

FIGS. 3A, 3B, and 3C are views for explaining differences in spray characteristics between single-shot injection and double-shot injection;

FIG. 16 shows views for explaining the application of a narrow-angle spray injector to a tumble guide cylinder injection engine;

FIG. 17 shows views for explaining the application of double-shot injection to an overhead type cylinder injection engine;

DETAILED DESCRIPTION OF THE INVENTION

Figure 1:
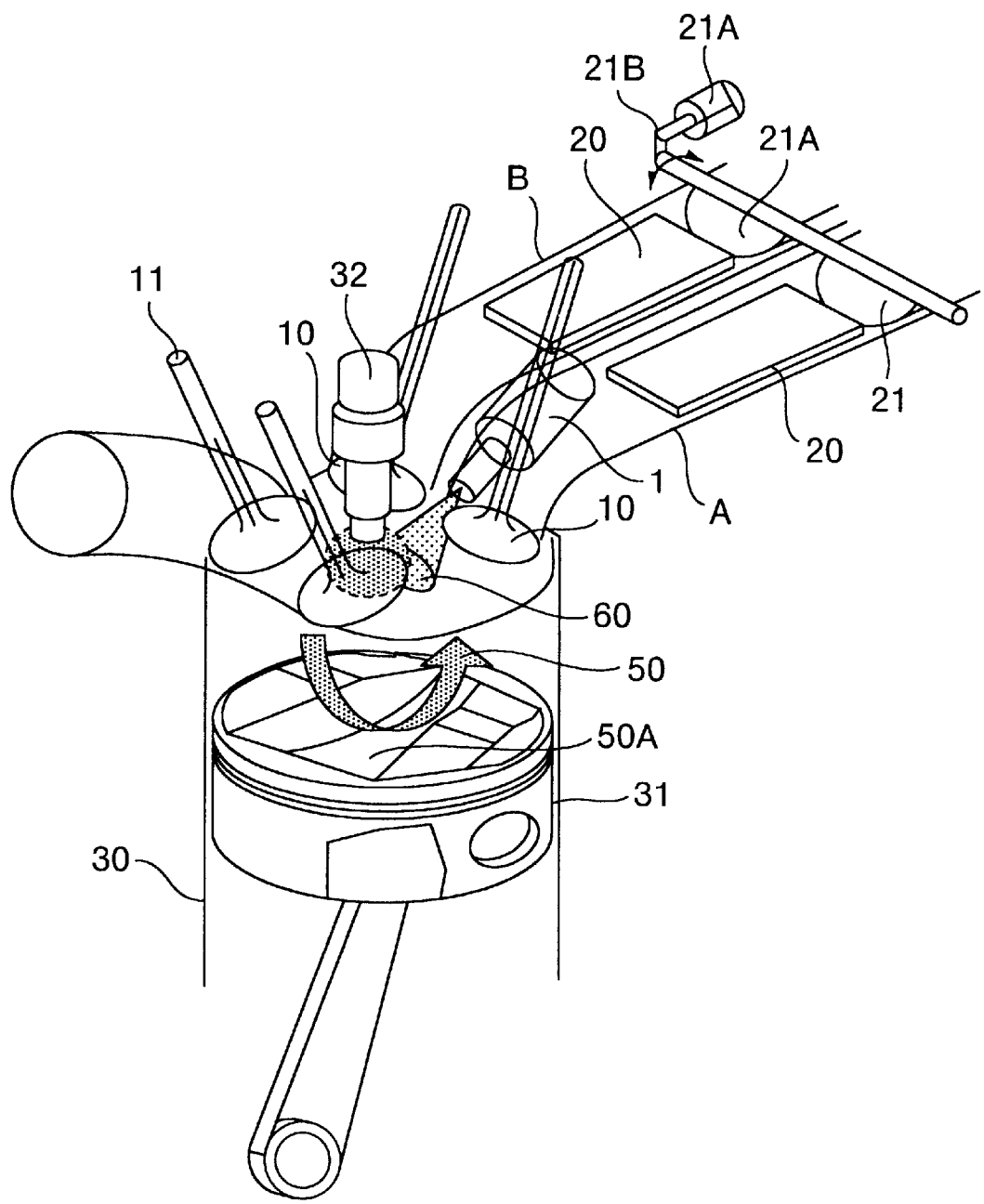
FIG. 1 is a perspective view of a tumble guide type cylinder injection engine.
Figure 2:
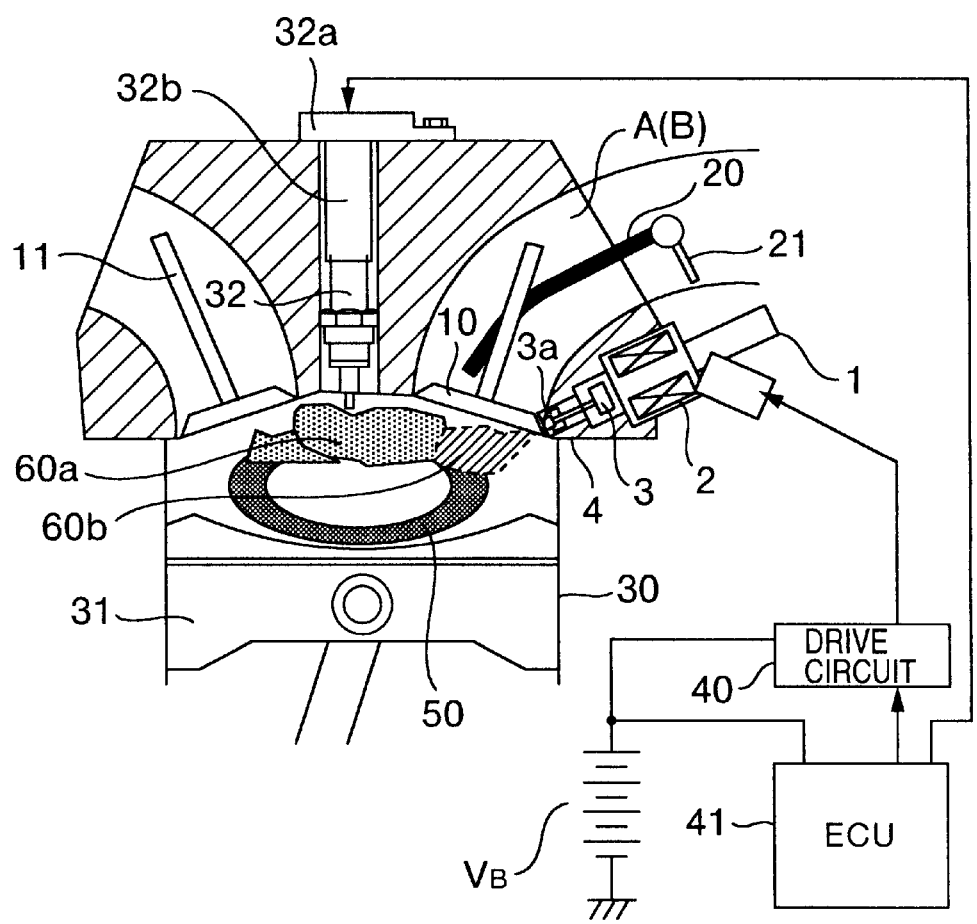
FIG. 2 is a sectional view of the tumble guide type cylinder injection engine.

An example system of a cylinder injection engine to which the invention is applied is shown in FIGS. 1 and 2.

The engine 30 is provided with two intake pipes A and B, plates 20 separating them horizontally, and air flow control valves 21 at the start points of the plates 20. These are configured to produce a forward tumble flow 50 moving from intake valves 10 to exhaust valves 11 and to a piston 31 within a combustion chamber.

The intensity of the air flow 50 can be varied by controlling the opening of the air flow control valves 21 by an electronically controlled actuator 21A through a link 21B. For facilitating retention of the tumble flow 50, a tumble retention groove 50A for guiding the tumble flow is formed in the top face of the piston 31.

An ignition plug 32 is located at the center of the combustion chamber, and an injector 1 for injecting fuel directly into the combustion chamber is disposed between the two intake valves 10 on the combustion chamber, while being tilted upward at an angle of 30 degrees from the horizontal with a fuel injection hole facing the cylinder.

The injector 1 comprises a solenoid valve with an electromagnetic coil, and its opening and closing is controlled by the control signals from an engine control unit (hereafter referred to as ECU) 41.

As a fuel injection control signal is input into an injector drive circuit 40 from ECU 41, an electromagnetic coil 2 of the injector 1, which will be described in detail later, is energized by a battery VB. Upon the energization, a plunger 3 is raised, a valve element 3a attached to the tip of the plunger 3 leaves a valve seat (not shown), and the high-pressure fuel pressurized by a high-pressure pump (not shown) is injected into the combustion chamber.

The fuel is injected with a swirling force imparted by a swirler 4, which is installed upstream of a valve 3a of the injection 1. Accordingly, in a intake stroke injection when the pressure in the combustion chamber is low, the fuel forms a hollow cone-shaped spray.

On the other hand, in a compression stroke injection when the combustion chamber pressure is high, the injected fuel collapses into a solid spray.

In this embodiment, in a stratified combustion region, the spray 60a injected first diffuses in the direction of the plug 32, remains around the plug 32, and then burns with a pilot flame of the spray 60b injected next, as shown in the figure.

In the figure, 32a denotes an ignition coil, which makes an ignition spark on the ignition plug 32 in response to an ignition signal from ECU 41.

Now the invention will be outlined with reference to FIGS. 3A and 3B. According to the invention, fuel is injected while being divided in plural times at very small intervals during the compression stroke.

A spray in the case of a single shot by an injector with a swirler, or when all the fuel needed for combustion is injected at once by a single opening of the injection valve during one fuel injection timing, has penetration L1 as shown in FIG. 3A. On the other hand, when the same quantity is divided and injected in two times, sprays have smaller penetration because of the reduced injection quantity per injection as shown in FIG. 3B.

Comparing the longer of the penetration L2 of the first injection and the penetration L3 of the second injection with the penetration L1 of the single-shot injection, the former L2 (or L3) is shorter.

Making similar comparison for an injector without a swirler upstream of the injection valve, for the same fuel supply quantity and the same fuel pressure, the degree of decrease of penetration when the same fuel quantity was divided and injected in two times was larger in the case of the invention having a swirler upstream of the injection valve.

Further, it was found that, when fuel was injected twice successively in the atmosphere of the same pressure, generally high density sprays built up in a small area as the second spray 60b arrived to lie over the first spray 60a that has lost its power for straight movement and stagnated.

In actual situations, however, the combustion chamber pressures at the time when the first injection 60a is effected and at the time for the second injection 60b are different. The pressure at the time of the first injection 60a is lower than that at the time of the second injection 60b.

By the way, the injector equipped with a swirler produces a hollow cone-shaped spray in a low-pressure atmosphere, and a solid compact spray in a high-pressure atmosphere.

Therefore, in the actual engine, as shown in FIG. 3C, the hollow cone-shaped spray 60a is injected by the first injection into the combustion chamber under a low pressure and spreads widely on an air flow because of its light weight. Then, the solid second spray 60b is injected by the second injection into the relatively high-pressure combustion chamber, which does not spread so widely as the first spray 60a and gathers around the plug, because fuel particles are relatively heavy as well as because the air flow has weakened.

This pressure difference in the atmosphere helps form an ideal air-fuel mixture with a rich air-fuel mixture layer formed around the plug and a lean air-fuel mixture formed around the first layer.

When an injection period T1 is long, for instance more than 2 ms, the hollow cone-shaped first spray injected from the injector with a swirler is formed in a bell shape due to a difference between its internal and external pressures, making the spray's divergence angles θ1 and θ2 more acute and thus suppressing the dispersion of the spray. In contrast, when the fuel is divided and injected in plural times, the injection period of each injection is reduced, making it possible to prevent the spray's divergence angles from becoming acute and thus disperse the fuel widely (θ1<θ2).

With the injector having a swirler, it is possible to control the divergence angle of a spray by selecting between the single-shot injection and the double-shot injection where the fuel is divided in two parts.

Figures 4, 5:
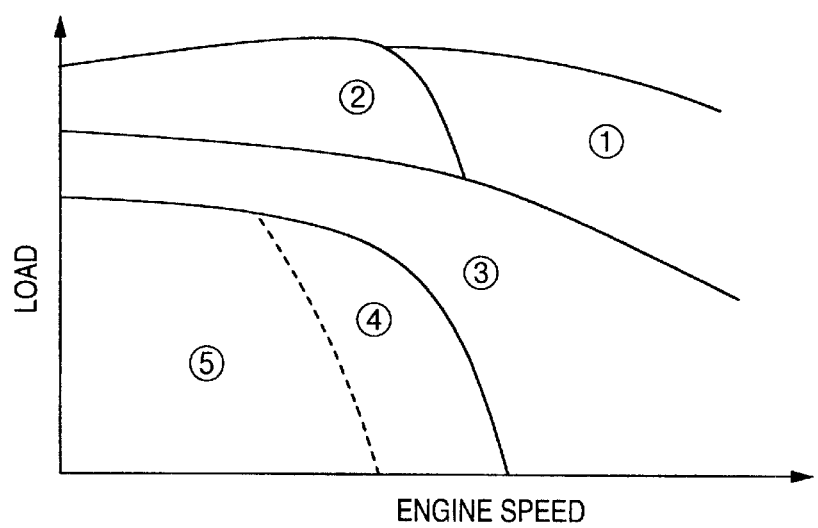
FIG. 4 is a table for explaining injection methods in respective operation zones.
FIG. 5 is a graph showing a map of injection methods based on engine speed and load.

FIG. 4 shows the injection pattern according to the invention, and FIG. 5 shows the operation zones of the cylinder injection engine to which the invention has been applied. In FIG. 5, the abscissa represents the engine speed, and the ordinance represents the load, ① and ② represent homogeneous operation zones, ③ a weakly homogeneous operation zone, and ④ and ⑤ stratified operation zones.

In the homogeneous operation zone ① under high load and high engine speed conditions, a large quantity of fuel has to be injected in a short period of time. Accordingly, fuel is injected in a single shot during the intake stroke or during the period from the exhaust stroke to the intake stroke, as shown in row (1) in FIG. 4. Under high engine speed and high load conditions, the air flow in the combustion chamber is strong, and a spray concentrates on the side of the intake valves to lower the utilization factor of air. The use of single-shot injection with strong penetration, which allows sprays to reach the exhaust valves and facilitates mixing, however, improves the output and the fuel economy.

In the high load and low engine speed zone ②, fuel is divided and injected in plural times during the intake stroke, as shown in row (2) in FIG. 4. This reduces spray penetration as well as fuel deposits on the exhaust-side cylinder wall and the piston crown.

Moreover, by shortening the injection period at each injection, it is possible to increase the spray angle of the first injection 60a and thereby facilitate mixing.

③ is the weakly stratified operation zone wherein which fuel is injected while being split between the intake and compression strokes, as shown in row (3) in FIG. 4. A lean air-fuel mixture is formed around the plug by the injection at the intake stroke, and weakly stratified combustion is achieved using the spray injected at the compression stroke as a pilot flame for firing.

④ is the stratified operation zone under a relatively high engine speed condition, in which fuel is injected all at once or at a single shot during the compression stroke, as shown in row (4) in FIG. 4, to achieve stratified combustion.

In the stratified operation zone ⑤ under low load and low engine speed conditions, the fuel sprays caused by multiple injections during the compression stroke, as shown in row (5) in FIG. 4, are guided by the air flow. This realizes stable stratified combustion in the region where stable stratified combustion is difficult to attain by any conventional engine. As a result, the stratified combustion region is extended as compared with the conventional art to enable the improvement of fuel economy and the reduction of emissions.

Figure 8:
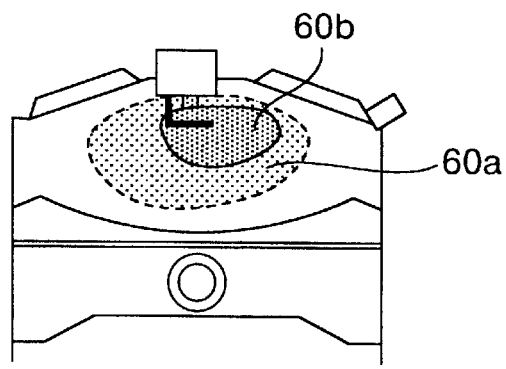
FIG. 8 is a view for explaining the distribution of weakly stratified air-fuel mixture in case of double-shot injection (with a long interval between first and second injections)

In the multi-shot (double-shot) injection on during the compression stroke shown in row (5) in FIG. 4, the first injection is done from the beginning to the middle of the compression stroke to form the layer 60a of lean air-fuel mixture near the plug as shown in FIG. 8. Then, the second injection is carried out from the middle to the end of the compression stroke to ignite and burn the spray 60b when it reaches the ignition plug.

Since the ignition plug is surrounded by a layer of flammable air-fuel mixture, a layer of lean air-fuel mixture is around the first layer and a layer of air surrounds the second layer, the air-fuel mixture burns efficiently. Further, no air-fuel mixture exists near the wall surfaces, and HC production is reduced in the quenching layer which does not lend itself to flame propagation. This achieves a reduction in HC emissions.

Figure 9:
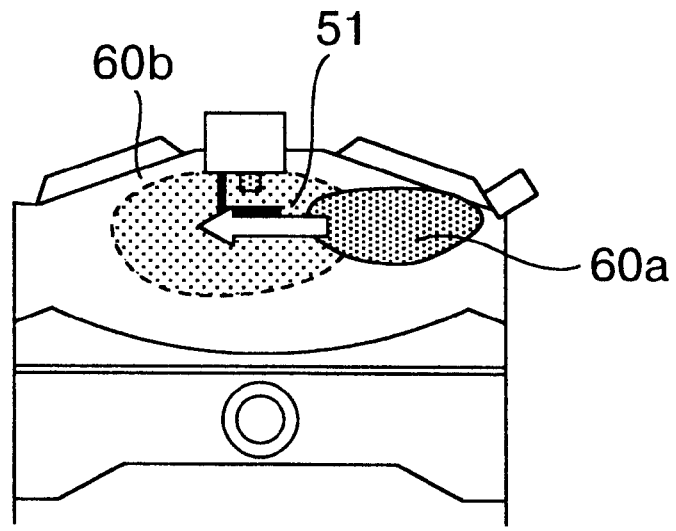
FIG. 9 is a view for explaining an air flow toward a plug generated by the first injection.

In this case, the second injection is performed at a latter stage of the compression stroke when the air flow is very weak, and if using conventional systems, the spray does not have enough penetration to reach the plug. According to the invention, however, the second injection can reach the plug because of the reason described above and because the first injection produces a flow in the direction of the plug as shown in FIG. 9 and the second injection is dragged by this flow. This extends the stable combustion region and further improves fuel economy.

Figure 10:
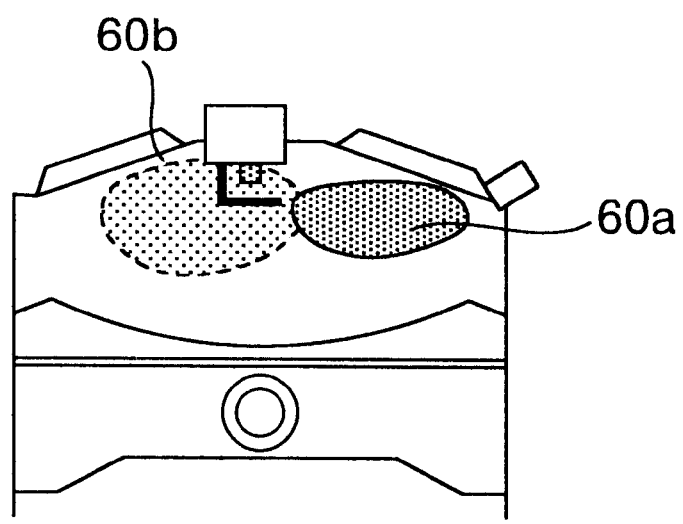
FIG. 10 is a view for explaining the distribution of weakly stratified air-fuel mixture in case of double-shot injection (with a short interval between first and second injections)

By making the interval between the first and second injections very short (around 1.5 ms) in the double-shot injection at the compression stroke shown in row (5) in FIG. 4, it is possible to prolong the time which is required for the air-fuel mixture to pass the plug, as shown in FIG. 10.

In a so-called tumble guide engine in which fuel is conveyed to the ignition plug by means of a tumble flow, air flow mixture can be injected only during the period when it passes the ignition plug. Accordingly, optimization of the timings of the first and second injections causes sprays to pass the ignition plug twice successively and enables ignition at both the timings to extend the zone of stable combustion region.

Figure 11:
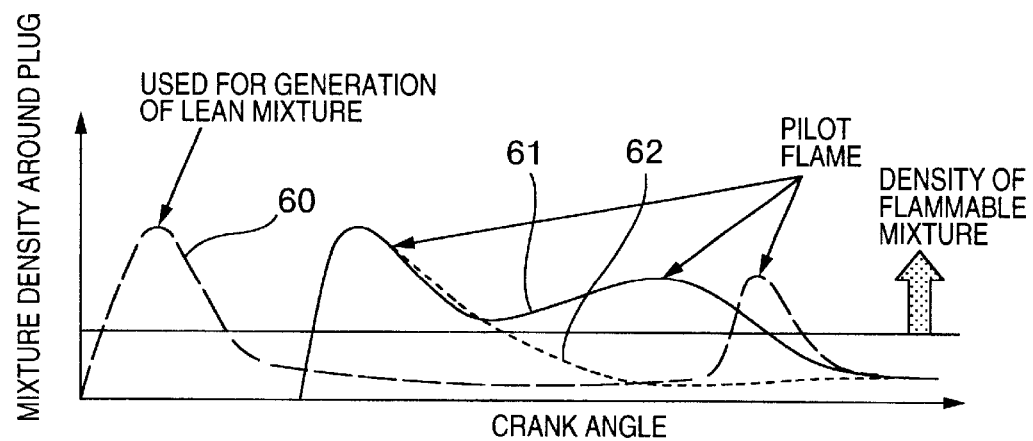
FIG. 11 is a graph for explaining the relationship between crank angles and air-fuel mixture density near a plug.

As described above, with the multi-shot injection at the compression stroke, controlling of the interval between the first and second injections provides two effects that are the improvement of fuel economy (air-fuel mixture curve 60 in FIG. 11) through the weak stratification of air-fuel mixture and the extension of the stable combustion region (air-fuel mixture curve 61 in FIG. 11) through the prolongation of the period in which air-fuel mixture passes the ignition plug.

Furthermore, in the situation where catalysts are not warmed up sufficiently at the time of starting, fuel is injected at the compression and expansion strokes, as shown in row (6) in FIG. 4. Lean combustion is carried out at the compression stroke, fuel is further injected at the expansion stroke, and the second spray is burnt using the excess air and combustion heat from the first combustion, to raise the exhaust gas temperature and reduce the warm-up time of the catalysts. Early activation of the catalysts enables exhaust emission control to serve for reducing emissions.

In this zone, air itself does not move much, and the effect of guiding fuel by air flow is little. Therefore, the fuel injection periods should be made longer than those in the other double-shot injection zones so as to extend penetration and thus make it easier for the sprays to reach the area around the plug.

During starting, in such a low engine speed zone that the engine is driven by a starter, fuel is injected, for initial combustion, into the cylinder where the piston is at rest halfway in the compression stroke. In this case, the use of the multi-shot injection at one injection timing according to the invention makes it possible to provide direct fuel injection apparatus that can effect the starting with stratified combustion from the beginning, is less in production of HC and realizes good fuel economy.

Usually, fuel pressure and injection rate at the time of starting are low, and the injection period has to be made a few times longer than that for the normal operation. With conventional direct fuel injection apparatus, fuel spray penetration is so large that fuel tends to deposit on the opposite wall or overshoot the ignition plug at the timing of ignition. Further, in such an operation condition, there is a problem that fuel pressure is low and fuel atomization is insufficient. Consequently, stratified combustion cannot be achieved, and the engine is started by homogeneous combustion.

This embodiment operates the injector twice at one injection timing, divides and injects fuel which is of the quantity for one injection in the conventional apparatus. This enables reduction of penetration, which in turn prevents fuel from depositing on the opposite wall. Also, fuel is atomized sufficiently even under low pressure because of the small fuel quantity. Consequently, the engine can be started with stratified combustion from the initial ignition.

Figure 6:
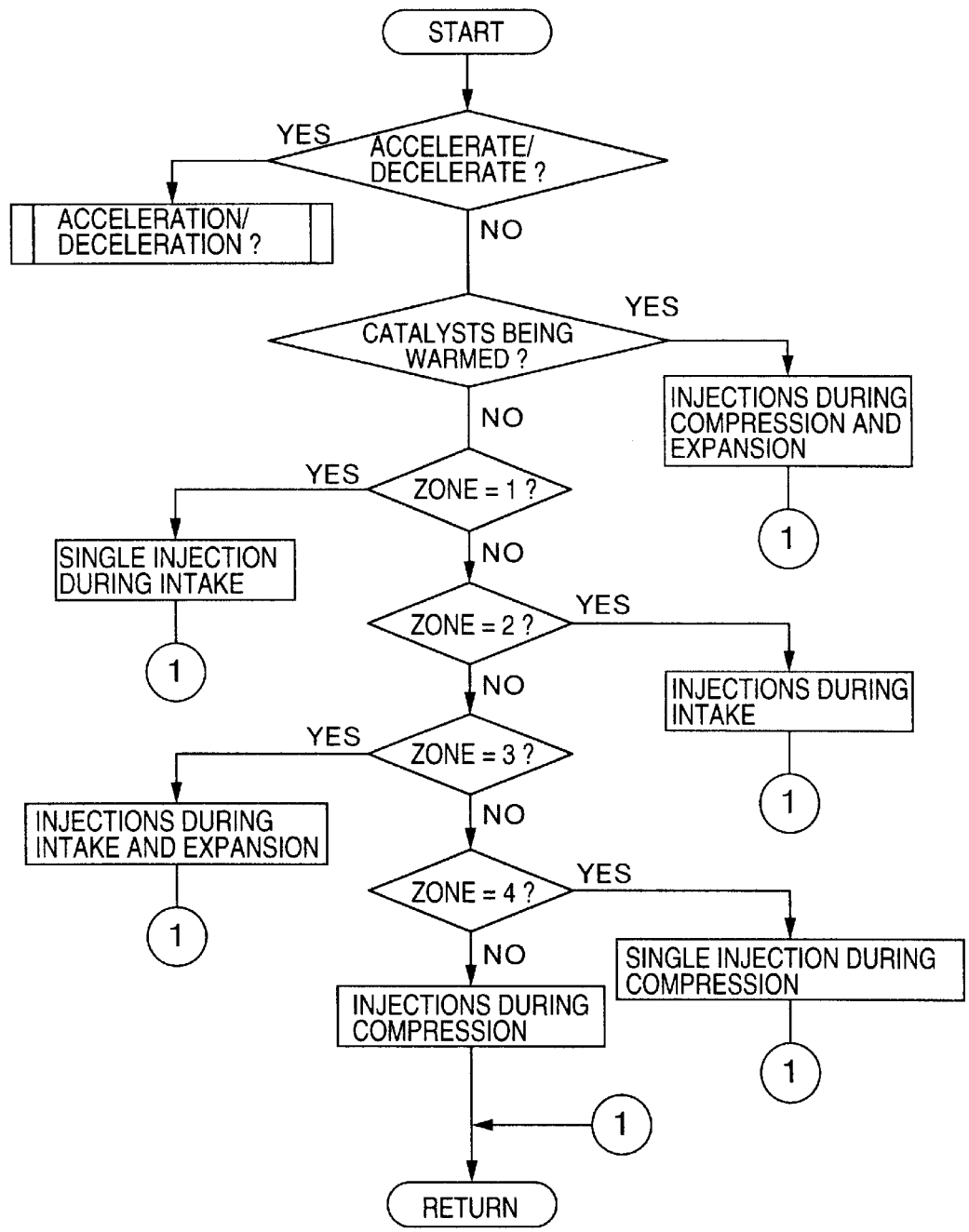
FIG. 6 is a flow chart illustrating how to select an injection method.
Figure 7:
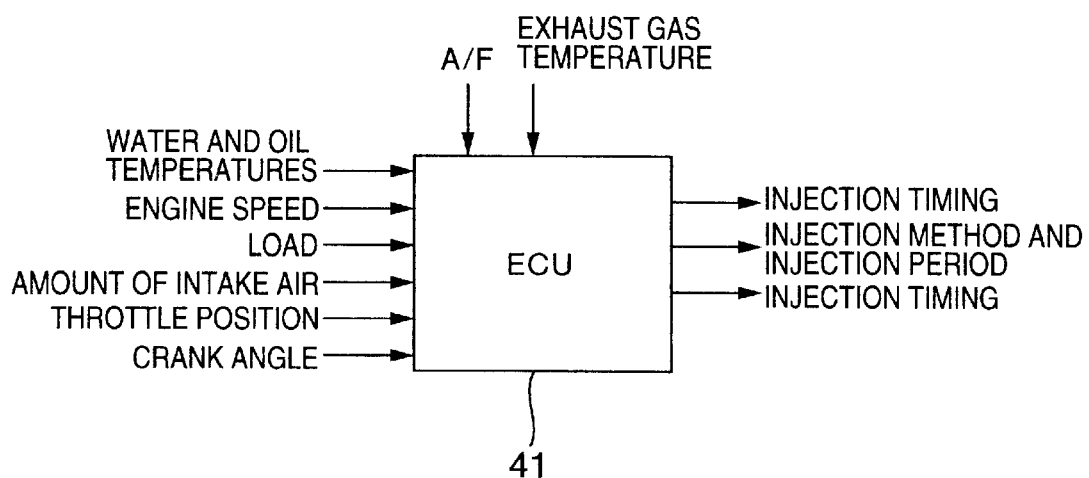
FIG. 7 is a schematic view for explaining the construction of an engine control unit.

As shown in FIG. 7, the ECU 41 receives the signals of the temperature of engine cooling water, temperature of engine lubricant, engine speed, load, throttle position, rotation angle of the crankshaft, A/F (output from an air-fuel ratio sensor or oximeter), etc. from various sensors installed on the engine, and determines the condition of the engine. Further, the ECU selects an injection method in accordance with the flow chart in FIG. 6, and outputs the injection timing, injection period, ignition timing, etc. to the injector drive circuit 40 and an ignition circuit 32a. 32b in FIG. 2 denotes the ignition coil.

Figure 12:
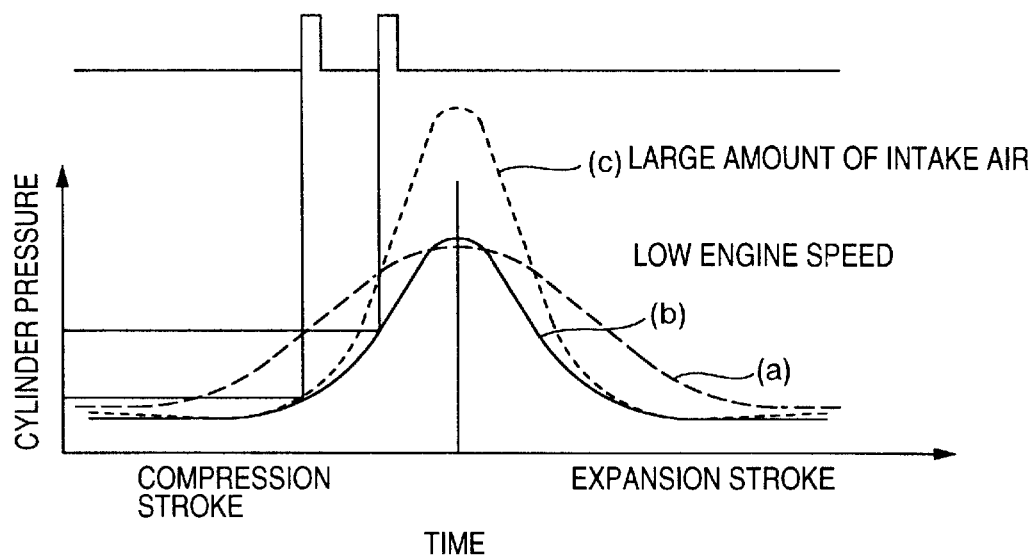
FIG. 12 and FIGS. 12A to 12C are a graph and views for explaining the effect on a spray caused by a cylinder pressure during injection.

Although the combustion chamber pressure varies little between two injection timings during a homogeneous operation, it varies during a stratified operation as shown in FIG. 12. The rate of change is a function of the injection timing, engine speed, and amount of intake air, and the injection interval has to be determined according to these conditions.

Figures 12A, 12B, 12C:
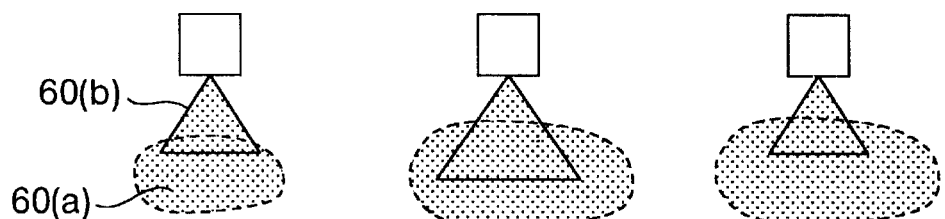

When the injection interval (time) is constant, judging on the basis of the state shown in FIG. 12B, under the condition shown in FIG. 12A in which intake air is abundant, the combustion chamber pressure at the time of the second injection is high and the spray is compact. Accordingly, there is a possibility that a space is given between the first and second sprays and they are separated from each other.

In the case of the low engine speed condition shown in FIG. 12C, there is not much pressure change, and the result is considered to be close to that of a steady-state spray testing.

Figure 13:
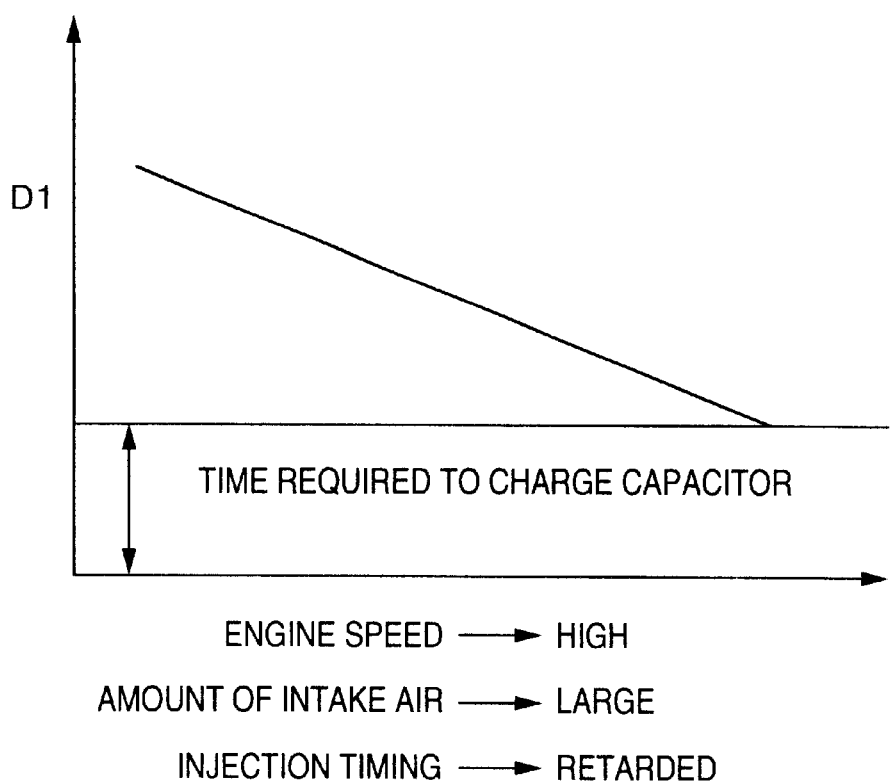
FIG. 13 is a graph for explaining the optimum value of injection interval D1.

To obtain the optimum air-fuel mixture for combustion, the injection dwell interval D1 between the first and second injections is shortened according as the engine speed and the amount of intake air increase or according as the injection timing is retard, as shown in FIG. 13. However, D1 must not be shorter than the time (approximately 1.5 ms) needed to charge the capacitor of a booster circuit that supplies power to the injector.

Figure 14:
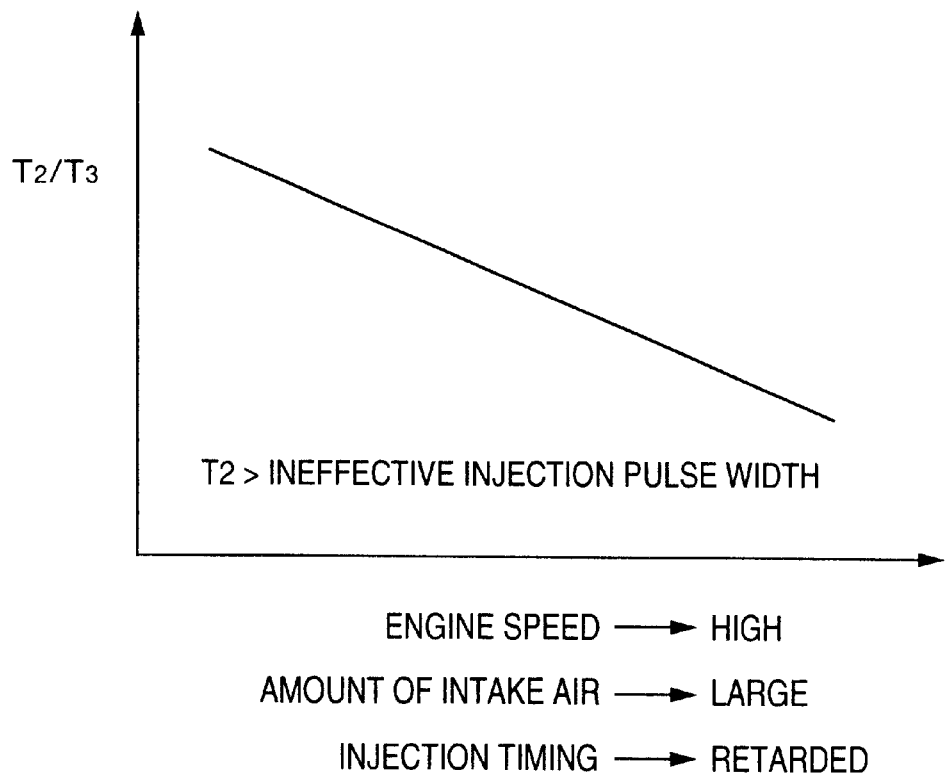
FIG. 14 is a graph for explaining the optimum value of injection rate T2/T3.

As shown in FIG. 14, T2/T3 is decreased according as the engine speed and the amount of intake air increase or according as the injection timing is retard. In other words, T3 is extended. However, T2 must be larger than the ineffective injection pulse width shown in FIG. 15.

Figure 15:
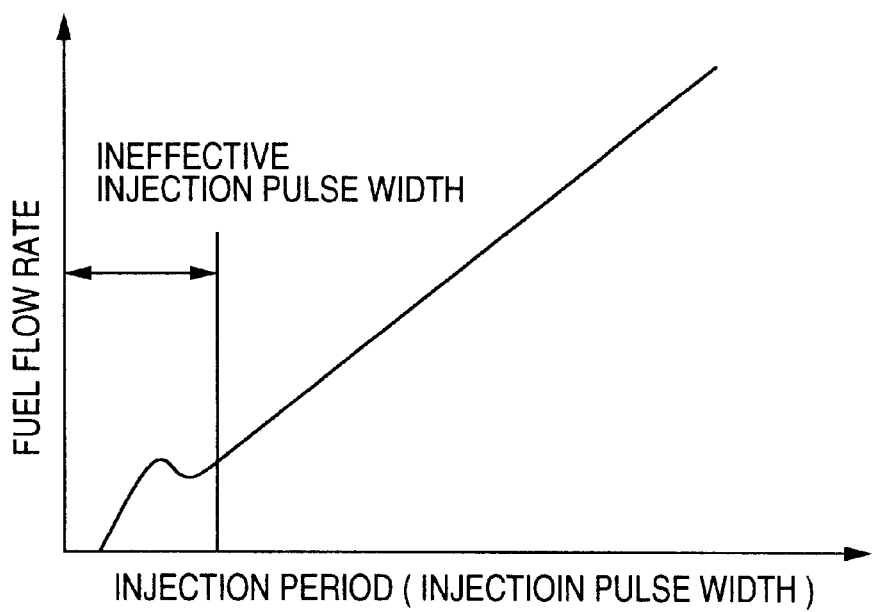
FIG. 15 is a graph for explaining the relationship between an injection period and a fuel flow rate.

FIG. 15 shows the relationship between the injection period and the fuel flow rate, and it can be seen that they are almost in direct proportion. However, shortening of the injection period causes a region where the change in the flow rate is not linear due to a lag in opening of an injector plunger and due to the instability of plunger operation.

An injection interval in the non-linear region is referred to as an ineffective injection pulse width and is not used. If the injection pulse width (injection interval) falls within this region, the fuel pressure is lowered to reduce the flow rate and the injection pulse width is prolonged to make up for it.

The engine according to the first embodiment employs the injector with the swirler, which is a wide-angle spray injector, to provide a spray angle large enough for the spray to reach the plug. It uses the multi-shot injection at the compression stroke in low engine speed and low load zones where relatively large penetration is required.

The second embodiment is shown in FIG. 16. Employed in this embodiment is a narrow-angle spray or solid-spray injector, which can provide relatively large penetration. Fuel is injected all at once at one injection timing under low engine speed and low load conditions with a short injection period. Under medium engine speed conditions in which too large penetration poses the problem of deposits on wall surfaces, and fuel is injected twice at one injection timing.

The use of the narrow-angle spray injector ennables the formation of fuel sprays that readily diiffuse in spite of strong downward flows from the intake valves even under homogeneous and high load conditions.

Under low load conditions, in which injection pulses are short, if an injection is split in two, the injection pulse width of one injection may become less than the ineffective injection pulse width. In such a zone, it is useful to lower the fuel pressure and increase the injection pulse width.

The third embodiment is shown in FIG. 17. This has a structure in which an injector is disposed aside the ignition plug in the center of the combustion chamber, not on the side of the engine head. During a stratified operation, double-shot injection at the compression stroke suppresses penetration. Accordingly, it is possible to reduce deposits on the piston crown surface and make a two-layered air-fuel mixture to provide an ideal mixing condition.

Moreover, since fuel is injected from the center of the combustion chamber, the air-fuel mixture does not pass through and stays in the center, ensuring stable combustion in wide ranges of injection and ignition timings. During a homogeneous operation, the spray conforms to the shape of the combustion chamber, ensuring effective use of air. Also in the homogeneous operation, double-shot injection at the compression stroke makes it possible to reduce deposits on wall surfaces through the suppression of penetration and to facilitate mixing through the expansion of spraying.

In the case of an injector that is operated by boosting a battery voltage with a booster and applying the high voltage to a coil, a long injection interval should be provided in order to open the injector multiple times in a short period of time at close intervals. This is because time is required to charge a capacitor with the battery voltage. If the capacitor is not charged to a sufficient voltage, the second opening of the valve may be delayed, resulting in inability to provide a required injection quantity. Usually, an interval of approximately 1.5 ms or more is required.

With the use of an injector that can be operated at the battery voltage is used, there is no need for voltage charging, and multiple injections can be performed at very close intervals. In this case, it is possible to extend the stable combustion region by injecting fuel twice at close intervals at the compression stroke even in the high engine speed zone of stratified combustion.

Furthermore, in an engine equipped with a 42-V battery, a fuel flow is stable even if the pulse width is smaller, the above method allows multiple injections without lowering the fuel pressure even in low load zones.

Figure 18:
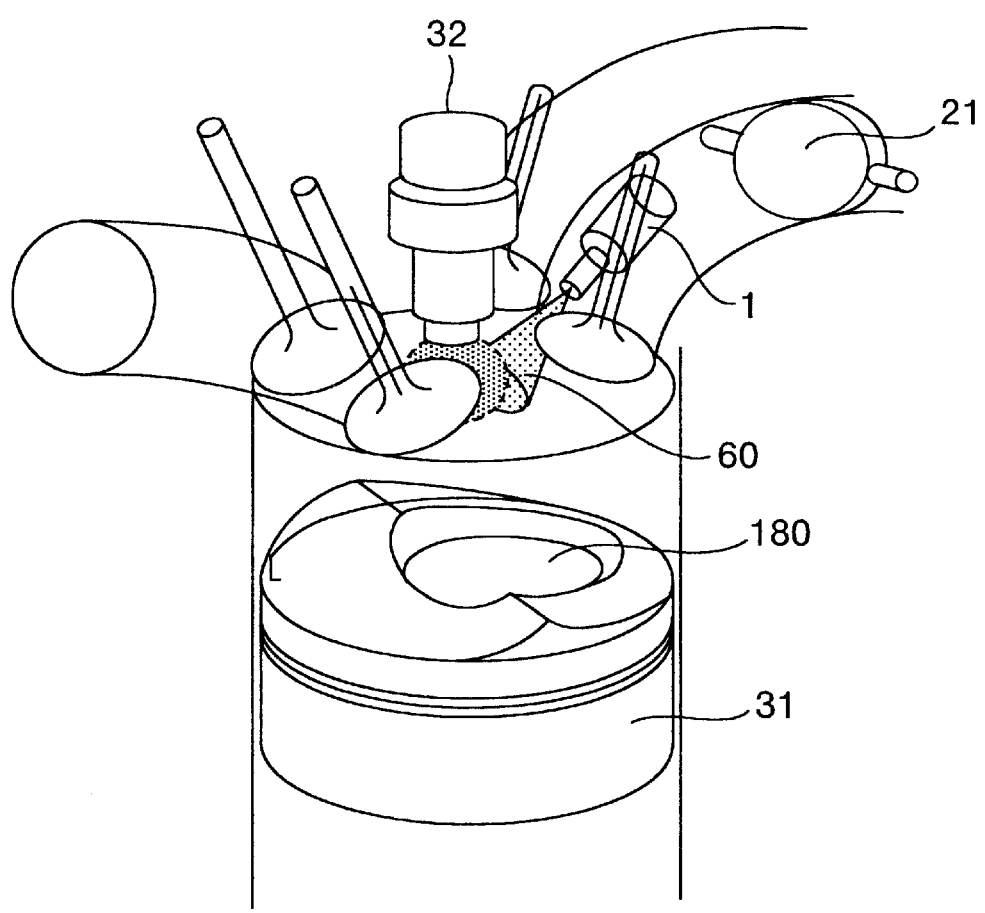
FIG. 18 is a view for explaining the application of double-shot injection to a wall-guide type cylinder injection engine.

Although the embodiments have been described in relation to the engines in which air-fuel mixture is guided by air to be stratified, the invention is applicable also to such a construction as shown in FIG. 18, in which air-fuel mixture is guided by a piston cavity 180.

Figure 19:
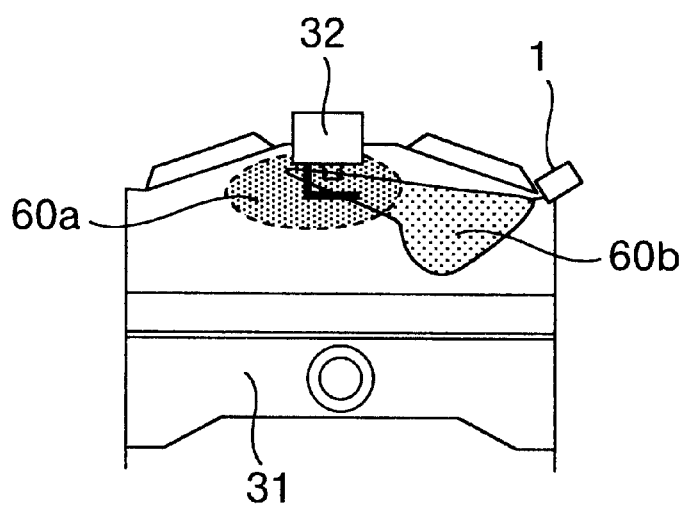
FIG. 19 is a view for explaining the application of double-shot injection to a flat-piston type cylinder injection engine.

In a cylinder injection engine whose piston has a flat crown surface as shown in FIG. 19, the fuel injected from the injector 1 directly hits the ignition plug 32 to form air-fuel mixture.

The injector 1 used is, for example, a solid-spray injector that makes the shape of a spray difficult to alter with changes in the cylinder pressure. It is important, in particular, that the spray angle in the direction of the ignition plug does not change. This will ensure that the fuel reaches the ignition plug without being affected by the injection timing and the engine speed.

Further, the piston has a flat shape without a cavity. This reduces cooling loss and intake loss on the piston crown surface, resulting in improved fuel economy.

In the engine of this construction, the time during which a spray passes the ignition plug is short, but it is possible to extend the time during which air-fuel mixture stays around the ignition plug and thus expand the stable combustion region by dividing injection in multiple times during one injection timing and properly adjusting the interval between the first and second injections.

Also, the division of injection in plural times at one injection timing enables the reduction of penetration. Accordingly, it is possible to reduce deposits on the wall surface on the side of the exhaust valves to improve fuel economy and exhaust emissions.

The embodiments have been described above in relation to the injector with the swirler or the solid-spray injector, the invention is applicable also to a hole-nozzle injector, a plate-nozzle injector and the like. Further, although the embodiments have been described as the examples of splitting an injection in two times, it is also possible to divide an injection into three or more times.

The detailed construction of the injector with the swirler used in the invention and that of the injector operated at battery voltages will be described with reference to FIGS. 20A, 20B, 21A, 21B, and 21C.

Figure 20A:
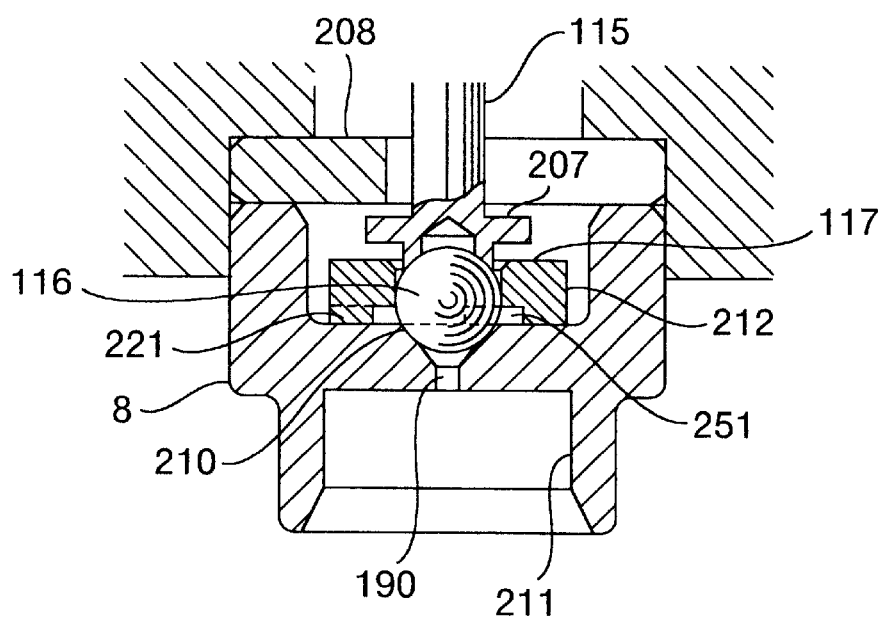
FIGS. 20A and 20B are views for explaining the essential part of an injector.

FIG. 20A is an enlarged view of an injector nozzle tip, in which the swirler 117 according to the invention is illustrated. In the swirler 117, axial grooves 212 and radial grooves 221 are formed, and further an annular space 251 is formed at the outlets of the radial grooves 221.

Each axial groove 212 consists of a passage with a semi-lunar cross section which is defined by the plane axially cut in the side face of the cylinder of the swirler 117 and by the cylindrical inner surface of the nozzle. These axial grooves 212 and the radial grooves 221 are the passages for the fuel introduced from above. The fuel that has passed the axial grooves 212 is led eccentrically with respect to the valve axis by the radial grooves 221 into a swirl space 231 upstream of a valve seat. This imparts a so-called swirling force to the fuel.

Figure 20B:
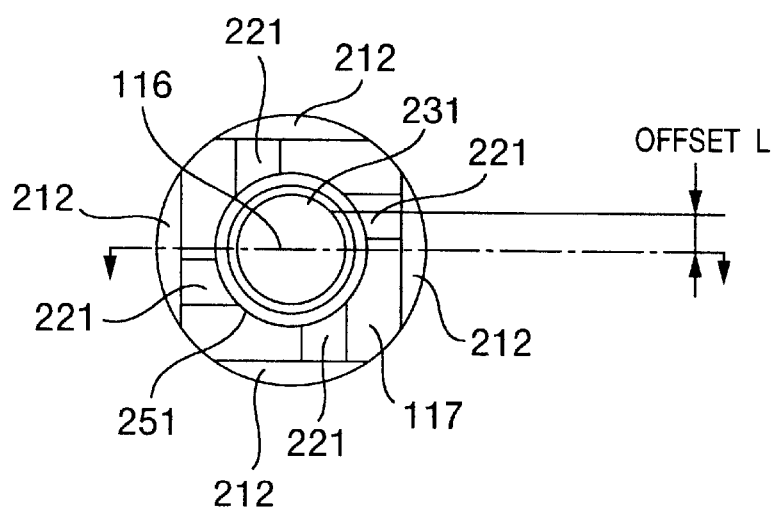

In this construction, the spray angle, i.e., the divergence angle of the fuel injected from the nozzle 208 can be controlled by adjusting an offset L (the distance between the valve axis and the center of the radial groove, shown in FIG. 20B), width, and/or depth of the radial groove 221 in the swirler 117. Although decreasing the offset L of the radial grooves 221 or increasing the width or depth of the grooves makes swirling flows prone to be generated, the annular space 251 has the effect of decreasing the variations in the swirling fuel.

The annular space 251 has a larger diameter as compared with the fuel swirling space 231 located downstream of it. Accordingly, even when the flow rate of fuel passing along the radial grooves 221 is decreased, it is possible to increase the swirling force and consequently use the swirl space effectively by increasing the offset L of the radial grooves 221. This makes it possible to obviate the variations as well as to positively facilitate mixing of the fuel.

As a valve 116 leaves the valve seat 210 twice at one injection timing, fuel flows each time through the axial grooves 212, the radial grooves 221, the annular space 251, the swirl space 231, and the injection hole 190, and is injected into the combustion chamber.

During the valve closing interval between the first and second injections, the fuel stays exclusively in the annular space 251 waiting for the second injection to take place reliably from the beginning.

If no such annular groove is provided, when the valve repeats opening and closing in a short period of time, fuel supply may fail to keep pace with the operation, resulting in fuel starvation.

The fuel injection valve used in the invention supplies fuel radially from outside to inside through the radial grooves 221 plural times during one injection timing. The valve does not change in its swirling effect on fuel even when the split spraying at high speed and performs stable atomization at the fuel nozzle, enabling stable fuel injection into the high-pressure combustion chamber.

Thus, the fuel injection valve of the invention provides the fuel atomization effect in the split injection and the fuel supply responsibility for high-speed valve operations, which are not possible with injectors without a swirler.

Embodiments of the injector and the fuel injection apparatus according to the invention will be described with reference to FIGS. 21A, 21B, and 21C.

Figures 21A, 21B, 21C:
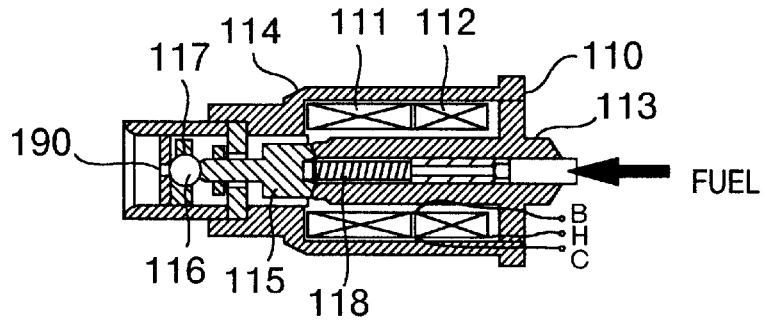
FIG. 21A is a view for explaining the construction of the injector.
FIG. 21B is a view for explaining the construction of the control circuit of the injector.
FIG. 21C is a view for explaining the operation of the injector.

FIG. 21A is a sectional view showing the overall structure of the injector 1 (an enlarged view of the tip nozzle is shown in FIG. 20A), and FIG. 21B is a schematic diagram showing the wiring configuration of the fuel injection apparatus (the injector 1 and the injector drive circuit 40).

At the outset, the structure of the injector 1 will be described with reference to FIG. 21A. The injector 1, to which pressurized fuel is supplied by a fuel pump, opens and closes the fuel passage between the ball valve 116 serving as a valve element and a seat surface (valve seat surface) 210 formed on the side of a yoke casing 114 to control the injection quantity of the fuel from the fuel injection hole 190.

The ball valve 116 is attached to the tip of a plunger 115, and the swirler 117 for fuel atomization is installed close to and upstream of the seat surface 210.

As a means for generating a driving force for the ball valve 116, the injector 1 is equipped with a control coil 111 and a holding coil 112. These coils, when energized, generate magnetic fluxes, forming a magnetic path passing through a core 113, a yoke 114, and the plunger 115. As a result, an attractive force is created between the facing ends of the core 113 and the plunger 115.

By this force, the plunger 115 and the ball valve 116 move in the direction away from the seat surface 210 (to the right in the figure), and fuel is injected. On the other hand, when no attractive force by the control coil 111 and the holding coil 112 (i.e., in the state of no coils energized), the ball valve 116 is pressed against the seat surface 210 by the spring force of a return spring 118 through the plunger 115, and the injector 1 is in the valve close state.

The control coil 111 and holding coil 112 are electrically connected at their one ends to form a terminal B. The other end of the control coil 111 provides a terminal C, and the other end of the holding coil 112 provides a terminal H.

The winding and wiring of the two coils are set such that magnetic fluxes are generated in the same direction (in the direction of reinforcing each other) on the control coil 111 and the holding coil 112 when the terminal B is connected to the positive terminal of a battery and the terminals C and H are connected to the negative terminals of the battery. The figure illustrates the wiring schematically.

The wiring configuration of the injector drive circuit 100 will be described with reference to FIG. 21B. In the figure, as concerns the injector 1, shown are the core 113, the control coil 111, and the holding coil 112.

The injector control circuit 100, to which the battery voltage from the battery VB is supplied, controls the energization of the control coil 111 and the holding coil 112, based on the injection signal from the engine controller 41.

The injector control circuit 100 has a holding coil transistor ON/OFF circuit 104 that controls the energization of the holding coil 112, and a control coil transistor ON/OFF circuit 114 that controls the energization of the control coil 111.

These transistor ON/OFF circuits share the information about the current to each coil, which is detected by a holding coil current detection resistor 103R and a control coil current detection resistor 113R. The transistor ON/OFF circuits send an energization signal to a power transistor 102t for the holding coil and a power transistor 112t for the control coil according to this information and responsive to the output of a signal processing circuit 120 which is based on the injection signal from the engine controller 41.

When the power transistor 102t for the holding coil and the power transistor 112t for the control coil are turned on, the voltage of the battery BV is applied to the holding coil 112 and the control coil 111. 101R and 111R denote the internal resistance of the holding coil 112 and the control coil 111 and the equivalent resistance of the drive circuit, respectively.

The control coil 111 and the holding coil 112 have different electrical characteristics. This is because the control coil 111 and the holding coil 112 play different roles in the phases of closing, opening, holding open, and closing the valve. In this embodiment, the control coil 111 is used exclusively in the Early Valve Opening state and the holding coil 112 is used in the Valve Held Open state.

The difference between these coils will be described below. First, the characteristics required of the coils when the valve is opened will be described below.

When the valve is opened, the setting load due to the return spring 118 described above and the fuel pressure of the pressurized fuel act on the ball valve, resulting in a large checking force against the valve opening operation. Only when the electromagnetic force develops large enough to overcome these forces, the plunger 115 starts displacement. Thus, it is necessary to minimize the time required to generate the force because it affects the delay in the valve opening operation.

Magnetomotive force is the product U (=NI) of the number of coil turns N (T) times in flowing current I(A) and can be used to assess the magnetic force attainable in a small amount of time $\Delta t$. If internal resistance of the drive circuit is zero (0), the smaller the number of turns, the smaller the inductance component and the resistance component become and thus the larger amount of current flows. Consequently, an increasingly larger magnetomotive force can be attained in a small amount of time $\Delta t$.

Magnetomotive force decreases with decrease in the number of coil turns. However, since coil inductance is proportional to the square of the number of turns, it was learned that the increase in current due to decrease in inductance is larger than the decrease in magnetomotive force due to decrease in the number of turns. Thus, in order to obtain a large magnetic force for opening a valve when operating on a low voltage such as a battery voltage, it appears more desirable, in terms of improving response characteristics, to gain magnetomotive force by means of current rather than by means of the number of turns.

Actually, however, in the drive circuit exists an internal resistance, which limits the maximum ultimate magnetomotive force as well as changes the optimum number of turns.

Furthermore, the ease with which current flows is affected not only by the coils in the injector, but also by the internal resistance of the control circuit, the resistance of switching devices, and any voltage drop. Therefore, it is necessary to minimize the internal resistance of the control circuit, the resistance of the switching devices, and voltage drops.

The coil used to open the valve, i.e., the control coil 111 according to this embodiment, and the power transistor 112t for the control coil 111 are constructed as follows.

First, the winding wire of the control coil 111 is a wire with low resistance and a large diameter. Besides, a bipolar, CMOS, or bi-CMOS transistor is used as the power transistor 112t to reduce the on-resistance at power-on and the equivalent internal resistance 111R of the control coil circuit.

Then, according to the resistance value of the internal resistance 111R determined based on the above-described construction, the number of turns is determined such that a magnetomotive force close to the maximum ultimate value will be attained.

Normally, a smaller magnetomotive force is needed to hold the valve open than to open it. This is because when the valve is open, the pressures at the front and rear of the ball valve 16 are balanced as a result of fuel injection, reducing the force resulting from the fuel pressure, and at the same time, the air gap enclosed by the core 113, the yoke 114, and the plunger 115 is reduced, raising the magnetic flux density in the air gap and consequently resulting in effective use of the magnetomotive force.

When the valve is closed following the period of holding the valve open, as the voltage application is terminated, the magnetomotive force lowers from that used to hold the valve open. The magnetic force is lowered, and when it becomes below the setting load of the spring 118, the valve begins to close. If the magnetomotive force used to hold the valve open is too large, however, there will be a delay in the valve closing operation.

Therefore, when holding the valve open, the minimum necessary magnetomotive force should be used.

The coil used to hold the valve open, i.e., the holding coil 112 according to this embodiment, and the power transistor 102t for the holding coil 112 are constructed as follows. First, the internal resistance of the holding coil 112 need not be made particularly small, and the wire diameter may be selected by giving priority to the space factor.

In this embodiment, the control coil 111 has the characteristics required to open the valve, and the holding coil 112 has the characteristics required to hold the valve open. Simply switching between those coils and energizing the selected coil enables ideal operation in individual phases.

Regarding the layout of the control coil 111 and the holding coil 112 in the core 113 and the yoke 114, it is desirable to place the control coil 111 nearer to the plunger 115. This is because, in the magnetic circuit consisting of the core 113, the yoke 114, and the plunger 115, magnetic fluxes concentrate near the coils. It is advantageous to place the control coil 111, in which a large magnetomotive force is generated at an early stage, nearer to the plunger 115 when the valve opening operation wherein a particularly large magnetic force is required. This embodiment can achieve a wide dynamic range that serves as a performance criterion.

To extend the dynamic range, it is necessary to keep the minimum injection flow rate at a low level. The injection quantity is controlled by the actuation time of the injection signal, and the length of the injection signal that gives the minimum injection flow rate is reduced to the minimum. To keep up with this short injection signal, delays in valve opening and closing operations should be reduced. That is achieved as follows in this embodiment.

The energization of the control coil 111 stops at Tp, but the energization of the holding coil 112 continues until the injection signal falls, i.e., until the valve close signal is issued after Tp.

At the time to start closing the valve, the smaller the current values of the coils 111 and 112, the faster the fall of magnetic fluxes, which is advantageous in reducing the delay in the valve closing operation. The magnetomotive force of the holding coil 112, in particular, is slower to fall than that of the control coil 111, so it is desirable that the current of the holding coil 112 should have the minimum necessary intensity.

The electrical characteristics of the holding oil 112 is determined such that the magnetomotive force reached in a small amount of time after the voltage application to the control coil 111 is large enough to generate the magnetic force needed to open the valve.

The holding coil 112 need not be turned on simultaneously with the input of the injection signal. It is all right if there is some delay. The attainable current during the fall of the injection signal for the holding coil 112 can be lower than when the coil is turned on simultaneously with the input of the injection signal. In this way, by delaying the energization of the holding coil 112, it is possible to reduce the current during the fall of the injection signal, i.e., during the valve close instruction, and thus reduce the delay in the valve closing operation.

In the invention, the current flow to the control coil 111 and holding coil 112 with the predetermined characteristics is interrupted twice during one injection timing.

The fuel injection apparatus constructed as described above operates as follows (see FIG. 21C). First, the ECU 41 outputs an injection instruction Tsg to the drive circuit 40 plural times depending on the operational status of the engine.

For the first injection T2, the drive circuit 40 turns on the power transistor 112t for the control coil and the power transistor 102t for the holding coil from the signal processing circuit 120 through the circuit 114. The total current as viewed from the battery is indicated by bold lines in the lower part of FIG. 20C.

The transistor 112t is turned off when time t2 elapses after it is turned on. On the other hand, the transistor 102t is kept on during the period T2 of the first injection. Consequently, the valve opened by the sum of the magnetomotive forces of the two coils is held open by the holding force of the coil 111. During this time, fuel is injected into the combustion chamber through the swirler.

When the time T2 elapses, power supply to the transistor 102t is also stopped. Accordingly, the coils are demagnetized, the plunger 115 is forced back by the return spring 118, and the valve 116 sits on the valve seat 120, closing the injection hole.

Then, after a very short interval t4 of valve closure, the drive circuit 40 again turns on the power transistor 112t for the control coil and the power transistor 102t for the holding coil from the signal processing circuit 120 through the circuit 114, for the second injection T3. The total current as viewed from the battery is indicated by bold lines in the lower left part of FIG. 20C.

The transistor 112t is turned off when time t3 elapses after it is turned on. On the other hand, the transistor 102t is kept on during the period T3 of the second injection. Consequently, the valve opened by the sum of the magnetomotive forces of the two coils is held open by the holding force of the coil 111. During this time, fuel is injected into the combustion chamber through the swirler.

When the time T3 elapses, power supply to the transistor 112t is also stopped. As a result, the coils are demagnetized, the plunger 115 is forced back by the return spring 118, and the valve 116 sits on the valve seat 120, closing the injection hole and ending the second injection. In this embodiment, although the injector is operated at a high speed, it can be operated at the supply voltage.

Furthermore, since the valve is held open by a small holding current after it is opened, the injector can be opened and closed two or more times during one injection time without much power consumption.

If the battery VB is 42 volts, the drive current can be lowered accordingly. Or if the current is not lowered, the number of coil turns can be reduced and thus the injector can be made smaller.

Each of the injectors of different types described above can be configured to combine their characteristics. For example, the injector with the swirler may comprise a battery-driven, two-coil injector. Also the solid-spray or narrow-angle spray injector may comprise a battery-driven, two-coil injector.

Figure 22:
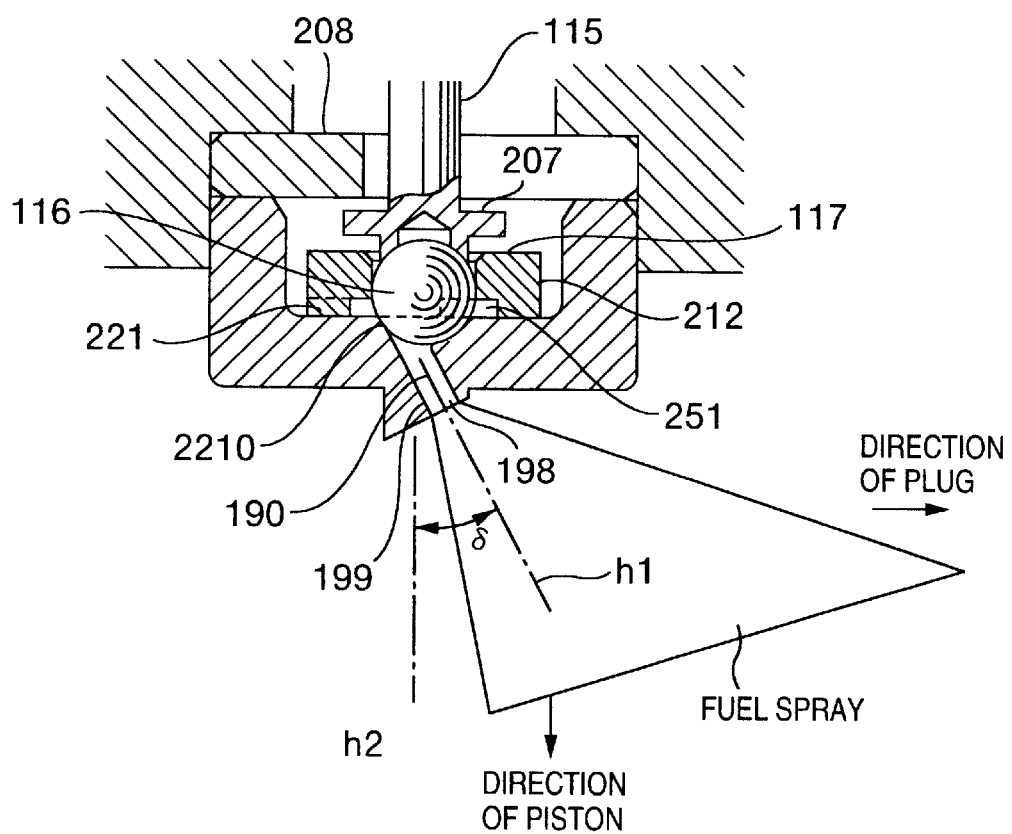
FIG. 22 is a view for explaining the essential part of a deflected-spray type injector.

Whatever injector is used, it can be constructed as a deflected-spray injector that is equipped at its tip with a deflection element 199 for deflecting a fuel spray toward the plug, as shown in FIG. 22. In this embodiment, the deflection element 199 is formed as a protrusion with a fuel delivery passage 198 whose central axis is tilted at an angle δ from the central axis h1 of the injector in the direction of mounting of the plug.

This injector can supply a deflected spray toward the ignition plug at least twice during one fuel injection timing. This construction eliminates the need for guide mechanisms such as air or piston cavity.

Therefore, it can be used in combination with a piston that has a flat crown surface. Also, there is no need to install tumble flow generators at the intake ports.

The present invention can extend the stratified operation zones for a cylinder injection engine. The other aspect of the invention can improve combustion stability, fuel economy, and emission characteristics by controlling air-fuel mixture formation variously according to operating conditions. The still other aspect of the invention can realize a system with low power consumption.

What is claimed is:

1. A fuel injection apparatus for cylinder injection type internal combustion engines, comprising a fuel injection valve for injecting fuel directly into a combustion chamber and configured with a fuel injection hole and an electromagnetic coil driving the fuel injection valve to open and close the fuel injection hole, wherein said fuel injection valve is operative, when driven to open the fuel injection hole, to discharge high pressure fuel through the fuel injection hole into the combustion chamber, and said electromagnetic coil being constructed to vary a state of current flow between a Valve Starting To Open state and a subsequent Valve Held Open state of said fuel injection valve; and a cycle of the Valve Starting To Open state and the Valve Held Open state is repeated at least twice during one fuel injection timing, in each of the at least two cycles, said electromagnetic coil driving the fuel injection valve to open the fuel injection hole, with fuel discharged in a first one of the at least two cycles being substantially the same in pressure with fuel discharged in a second one of the at least two cycles.

2. The apparatus according to claim 1, wherein the cycle of the Valve Starting To Open state and the Valve Held Open state is repeated at least twice at a given valve closing interval during one fuel injection timing.

3. The apparatus according to claim 1, wherein said fuel injection valve is installed at a center of the combustion chamber and injects fuel from a top of the combustion chamber into the combustion chamber.

4. The apparatus according to claim 1, wherein said fuel injection valve comprises an upstream swirler type fuel injection valve.

5. The apparatus according to claim 1, wherein said fuel injection valve is operated at voltages equal to or lower than a voltage generated by a battery mounted on the engine.

6. A fuel injection apparatus for cylinder injection type internal combustion engines, comprising a fuel injection valve for injecting fuel directly into a combustion chamber and configured with a fuel injection hole and two electromagnetic coils driving the fuel injection valve to open and close the fuel injection hole, said fuel injection valve being operative, when driven to open the fuel injection hole, to discharge high pressure fuel through the fuel injection hole into the combustion chamber, and said electromagnetic coils being constructed to switch a state of current flow between a Valve Starting To Open state and a subsequent Valve Held Open state of said fuel injection valve, and the state of current flow is switched so that a cycle of the Valve Starting To Open state and the Valve Held Open state is repeated at least twice during one fuel injection timing, in each of the at least two cycles, said electromagnetic coils driving the fuel injection valve to open the fuel injection hole, with fuel discharged in a first one of the at least two cycles being substantially the same in pressure with fuel discharged in a second one of the at least two cycles.

7. The apparatus according to claim 6, wherein the cycle of the Valve Starting To Open state and the Valve Held Open state is repeated at least twice at a given valve closing interval during one fuel injection timing.

8. The apparatus according to claim 6, wherein said fuel injection valve is provided at a center of the combustion chamber and injects fuel from a top of the combustion chamber into the combustion chamber.

9. The apparatus according to claim 6, wherein said fuel injection valve comprises an upstream swirler type fuel injection valve.

10. The apparatus according to claim 6, wherein said fuel injection valve is operated at voltages no greater than a voltage generated by a battery mounted on the engine.

* * * * *